United States Patent
Blandy et al.

(10) Patent No.: US 6,654,778 B1
(45) Date of Patent: Nov. 25, 2003

(54) METHOD AND APPARATUS FOR AVOIDING FUNCTION ACTIVATION AND INTERPRETATION OVERHEAD FOR CALLS TO SELECTED JAVA METHODS IN A JAVA VIRTUAL MACHINE INTERPRETER

(75) Inventors: Geoffrey Owen Blandy, Austin, TX (US); Bentley John Hargrave, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,018

(22) Filed: Jan. 29, 1999

(51) Int. Cl.7 .................. G06F 17/00; G06F 9/44; G06F 9/45

(52) U.S. Cl. ................... 709/1; 717/118; 717/136; 717/148

(58) Field of Search ................. 709/100–107, 709/1; 717/100, 114, 116, 118, 148, 151, 153, 166

(56) References Cited

U.S. PATENT DOCUMENTS

| | | | | |
|---|---|---|---|---|
| 6,041,179 A | * | 3/2000 | Bacon et al. | 717/116 |
| 6,081,665 A | * | 6/2000 | Nilsen et al. | 717/116 |
| 6,151,618 A | * | 11/2000 | Wahbe et al. | 709/1 |
| 6,289,506 B1 | * | 9/2001 | Kwong et al. | 717/148 |
| 6,292,883 B1 | * | 9/2001 | Augusteijn et al. | 712/209 |
| 6,295,638 B1 | * | 9/2001 | Brown et al. | 717/148 |
| 6,295,643 B1 | * | 9/2001 | Brown et al. | 717/148 |
| 6,308,315 B1 | * | 10/2001 | Dice et al. | 717/106 |
| 6,513,156 B2 | * | 1/2003 | Bak et al. | 717/151 |

* cited by examiner

*Primary Examiner*—Majid A. Banankhah
*Assistant Examiner*—Syed Ali
(74) *Attorney, Agent, or Firm*—Duke W. Yee; Jeffrey S. LaBaw; Michael R. Nichols

(57) ABSTRACT

A method and apparatus for a process in a computer for processing a method that performs a function. A determination is made as to whether the method is to be executed normally when the method is loaded. Responsive to an absence of a determination that the method is a method to be executed normally, instructions native to the computer are associated with the method, wherein the instructions perform the function.

26 Claims, 3 Drawing Sheets

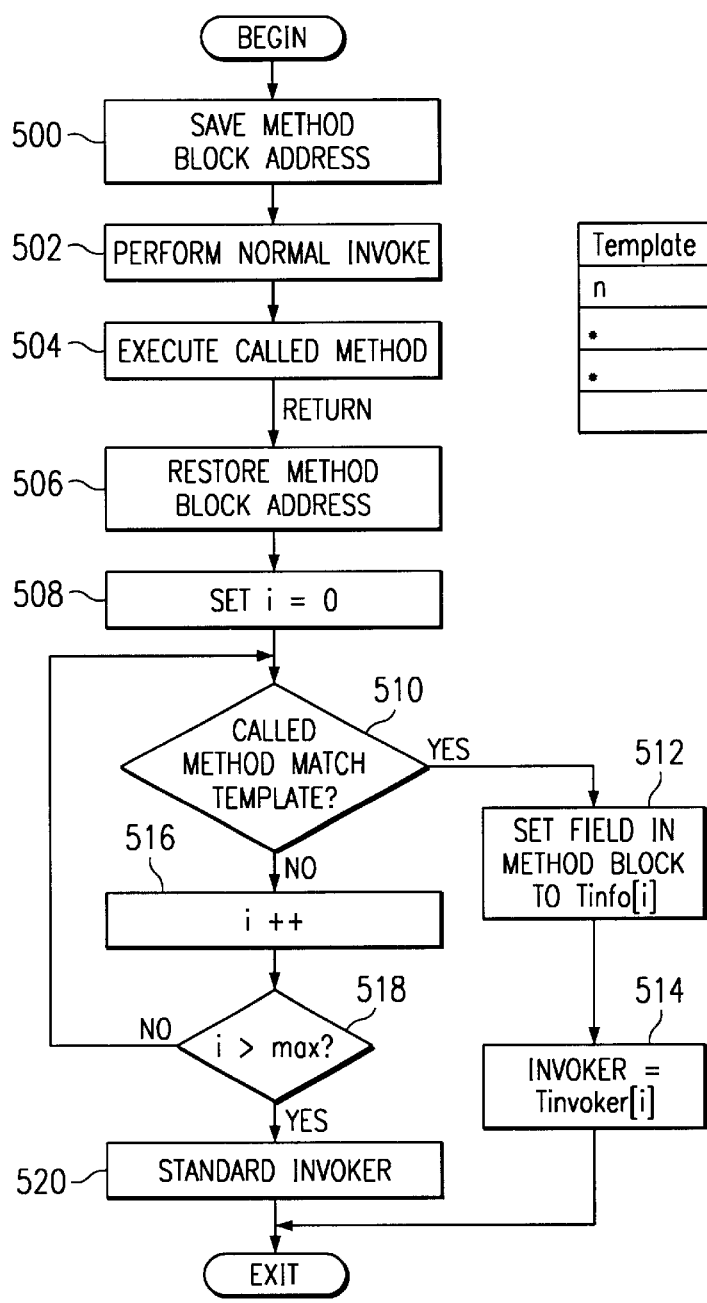
FIG. 5
FIG. 6
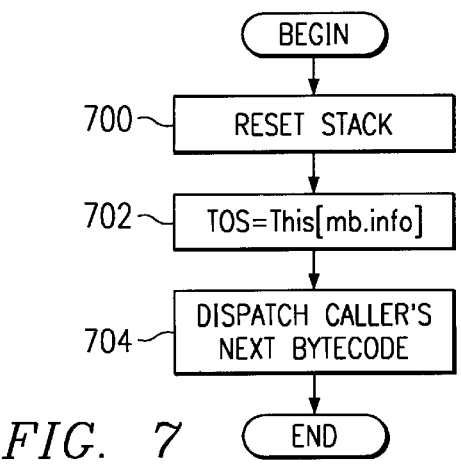
FIG. 7

METHOD AND APPARATUS FOR AVOIDING FUNCTION ACTIVATION AND INTERPRETATION OVERHEAD FOR CALLS TO SELECTED JAVA METHODS IN A JAVA VIRTUAL MACHINE INTERPRETER

BACKGROUND OF THE INVENTION

1. Technical Field

The present invention relates generally to an improved data processing system and in particular to a method and apparatus for processing methods in a data processing system. Still more particularly, the present invention relates to a method and apparatus for avoiding function activation and interpretation overhead for calls to common, trivial Java methods in a Java virtual machine interpreter.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

When extra speed in executing a Java program is needed, a Just In Time (JIT) compiler may be used to translate bytecodes for a method or class into native machine instructions before executing them. Typically, this compilation only occurs once per method. Some JIT compilers may compile entire classes, rather than one method at a time.

When a JVM interpreter encounters an invoke bytecode, the JVM interpreter locates the appropriate method to be called and then calls the method. This calling of the method may be performed by locating a method block and branching to the invoker for the method. The method block identifies the invoker and is a per method data structure. The invoker performs the function activation and interpretation and creates a stack frame for the target method. This process performed by the invoker involves insuring that parameters are passed appropriately to the target method. A monitor, also referred to as a lock, is obtained by the invoker if the method is synchronized. Other housekeeping chores may be involved based on the particular target method.

During the course of interpretation of bytecodes, when an invoke bytecode for a method is encountered, the interpreter will branch to the invoker whose address is specified for the method. The invoker for a method goes through a standard function activation and interpretation, creating a frame and beginning to interpret the methods of the bytecode. Often times, methods are called by Java programs in which the methods perform trivial tasks. These method calls incur the complete overhead of a method invocation including the creation and destruction of a function activation frame and method interpretation. This overhead is significant for these small or trivial methods.

Therefore, it would be advantageous to have an improved method and apparatus for avoiding function activation and interpretation overhead for calls to selected methods in the JVM interpreter.

SUMMARY OF THE INVENTION

The present invention provides a process in a computer for processing a method that performs a function. A determination is made as to whether the method is to be executed normally when the method is loaded. Responsive to an absence of a determination that the method is a method to be executed normally, instructions native to the computer are associated with the method by modifying the invoker pointer, wherein the instructions perform the function.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for processing a method using a first time invoker in accordance with a preferred embodiment of the present invention;

FIG. 6 is a diagram illustrating a data structure containing templates in accordance with a preferred embodiment of the present invention; and FIG. 7 is an example of the process performed by a trivial invoker in accordance with a preferred embodiment of the present invention.

DETAILED DESCRIPTION OF THE PREFERRED EMBODIMENT

Figure 1:
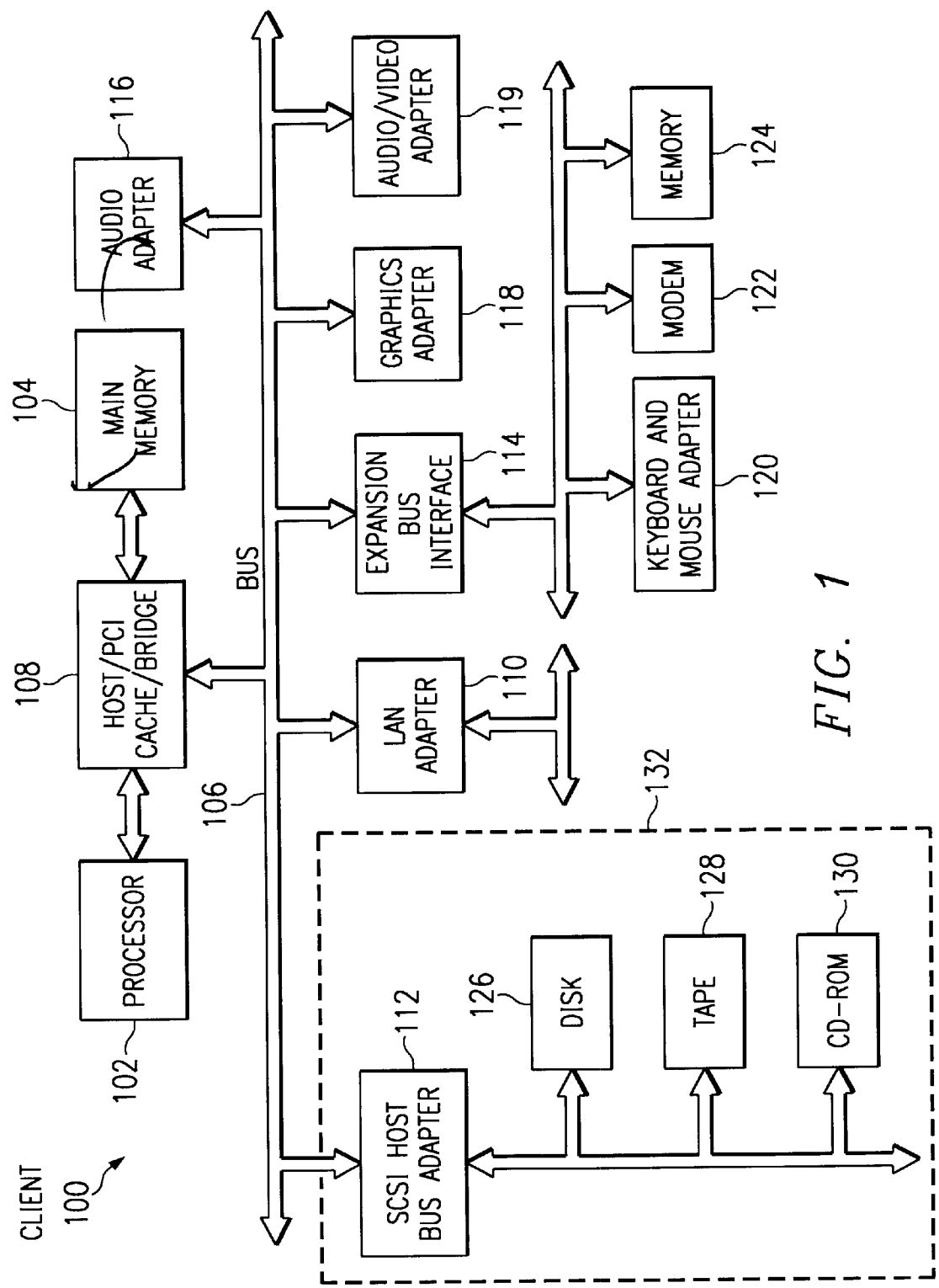
FIG. 1 is a block diagram illustrates a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/or user-generated data.

The depicted example in FIG. 1 and above-described examples are not meant to imply architectural limitations with respect to the present invention.

The present invention provides method, apparatus, and instructions for avoiding function activation and interpretation overhead for invocations of certain methods that match selected archetypes. The selection of these archetypes is not a subject of this invention but could be achieved through the instrumentation of a JVM to allow the identification of the most commonly executed method types and the examination of these methods to determine those that could benefit from the techniques provided by this invention. The present invention provides a means to identify methods that match the selected archetypes and to improve the efficiency of subsequent invocations of the selected methods. Specifically, the method blocks of the selected methods are modified to point the invoker fields to native code that will bypass the interpreter and directly execute the function of the method. This native code is subsequently referred to as a trivial invoker.

While it is possible that some large complex methods could be identified as appropriate candidates for the treatments provided by this invention, it is more likely that small trivial methods would be found appropriate.

The present invention is particularly useful in small computing devices in which the overhead of a just-in-time compiler to increase performance is too large. The footprint to implement the present invention is small. The present invention is also appropriate in the Just in time compiled (Jited) environment when in-lining is infeasible or would require extra checking. In such an instance, the mechanism of the present invention is faster than invoking a Jited method. When the JVM loads and initializes a class and prepares the methods for invocation, the JVM may perform a quick examination of the methods to determine if any are candidates to have their function subsumed by the specialized invoker provided by this invention.

For example, if the method is a trivial method that would incur significant overhead and function activation and interpretation in relation to its size, the method would be a suitable candidate for the processes of the present invention. If the method is recognized as one to be altered, the JVM will change the invoker for the method to point to native code, which implements the method instead of the normal invoker for the method. During the normal course of interpretation of bytecodes, when an invoke bytecode for the method is encountered, the interpreter will branch to the invoker whose address is specified for the method. Normally, the invoker for the method goes through a function activation and interpretation, which includes creating a frame and beginning to interpret the bytecodes of the method. In the present invention, for selected methods, the invoker field of the method block is set to point to native code that completely implements the method and avoids function activation/deactivation and traditional interpretation.

The present invention is especially applicable to methods that are considered trivial. In the depicted example, a trivial method may be a method that has fewer bytecodest than that of the size of the maximum template from a set of templates to which the method is to be compared. For example, if the maximum template, the template having the largest number of bytecodes, is eight, then a potentially trivial method is one that has eight or fewer bytecodes. Of course, other standards might be implemented to determine whether a method is trivial. Depending on the implementation, other numbers of bytecodes may be employed to determine whether a method would be considered trivial and a candidate for the processes of the present invention. Some examples of Java methods, which are considered trivial Java methods to which the present invention may be implied are a null method, a "getter" method, and a "setter" method. The null method is very common in object oriented programming. For example, a null method is a method, which does nothing but return to its caller. In more specific terms, a null method is a method, which has a bytecode length of 1, the single bytecode "return". An example would be java.lang.Object.<init>. In accordance with a preferred embodiment of the present invention, the invoker for a null method would simply adjust the Java stack to remove the parameters to the null method and then continue with the interpretation of the bytecodes of the calling method.

The "getter" method also is very common in object oriented programming, used to encapsulate data in an object so that the data may be viewed by calling a method which returns or "gets" the value of the data, thus a "getter" method. This method does nothing more than return the value of the data to the caller. In more specific terms, this is a method, which consists of the bytecodes "aload_0" followed by a "getfield", followed by one of the "return" bytecodes. The invoker for a "getter" method would simply adjust the Java stack to remove the parameters to the method, place the data from the referenced object on the Java stack, and then continue with the interpretation of the bytecodes of the calling method.

The "setter" method is the converse of the "getter" method. This method does nothing more than set the data to the value supplied by the caller. In more specific terms, the setter method is a method, which consists of the bytecodes "aload_0", followed by "aload_1", followed by a "putfield", followed by "return". The invoker for a "setter" method would simply adjust the Java stack to remove the parameters to the method, place the value for the data into the referenced object, and then continue with interpretation of the bytecodes of the calling method.

Figure 2:
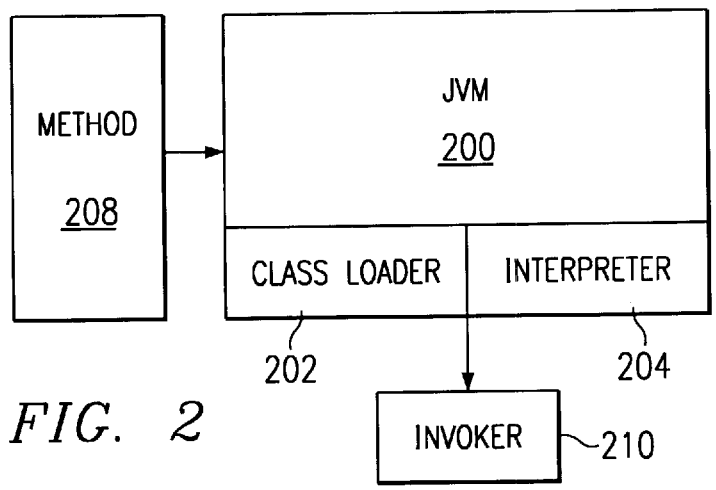
FIG. 2 is a block diagram of components used to process methods in accordance with a preferred embodiment of the present invention.

With reference now to FIG. 2, a block diagram of components used to process methods are depicted in accordance with a preferred embodiment of the present invention. In the depicted example, JVM 200 includes a class loader 202, and an interpreter 204. JVM 200 will start execution by invoking a method of a specified class. In the depicted example, the method may be for example, main. The method may be passed as a single argument in the form of an array of strings. This causes the specified class to be loaded, linked to other types that it uses, and initialized. The loading of a class involves the finding of the binary form of a class or interface type of the particular name.

In the depicted example, the loading process is implemented by class loader 202. Class loader 202 in this example includes a ClassLoader class, which includes methods for loading new classes into the Java runtime environment. The class loader is an object responsible for loading classes. Given the name of a class, the class loader will attempt to locate or generate data that constitutes a definition for the class. Typically, a class loader will transform the name of a class into a file name and then read a "class file" of that name from a file system. In this case, interpreter 204 contains the processes and data structures used to interpret bytecodes within method 208 for execution within the data processing system. The interpreter is directed by the bytecode to execute native code to perform the function indicated by the bytecode.

When interpreter 204 encounters an invoke bytecode, interpreter 204 will locate an appropriate method, such as method 208. Thereafter, the process will branch to invoker 210, which will perform the necessary setup for execution of method 208. Invoker 210 is the routine that performs the actual setup prior to passing control to the Java interpreter.

Figure 3:
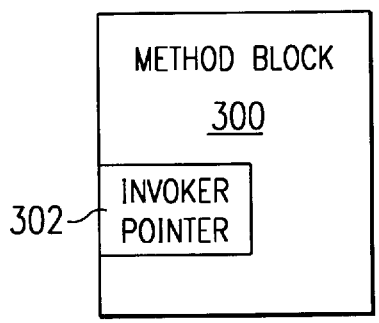
FIG. 3 is an illustration of a method block in accordance with a preferred embodiment of the present invention.

With reference now to FIG. 3, an illustration of a method block is depicted in accordance with a preferred embodiment of the present invention. Method block 300 includes invoker pointer 302. Invoker pointer 302 is a pointer to an invoker, which is a routine that performs the required setup for execution of the method and then causes the execution of the method by branching to the compiled code or by passing control to the interpreter for non-compiled code.

Method block 300 also includes other information used by JVM 200 to execute method 208 in FIG. 2. For example, the method block will also contain the number of arguments, local variables, size of code, the maximum size of the stack, along with other information used to process or execute the method. The description of the method, debugging information, and exception table definitions are examples of other information that also may be contained within method block 300.

In accordance with a preferred embodiment of the present invention, invoker pointer 302 may be set to point to code comprised of instructions native to the computer. Native code would implement the functions performed by the method, rather than the normal invocation of the method. In this manner, the function activation and interpretation overhead for the method is avoided.

Figure 4:
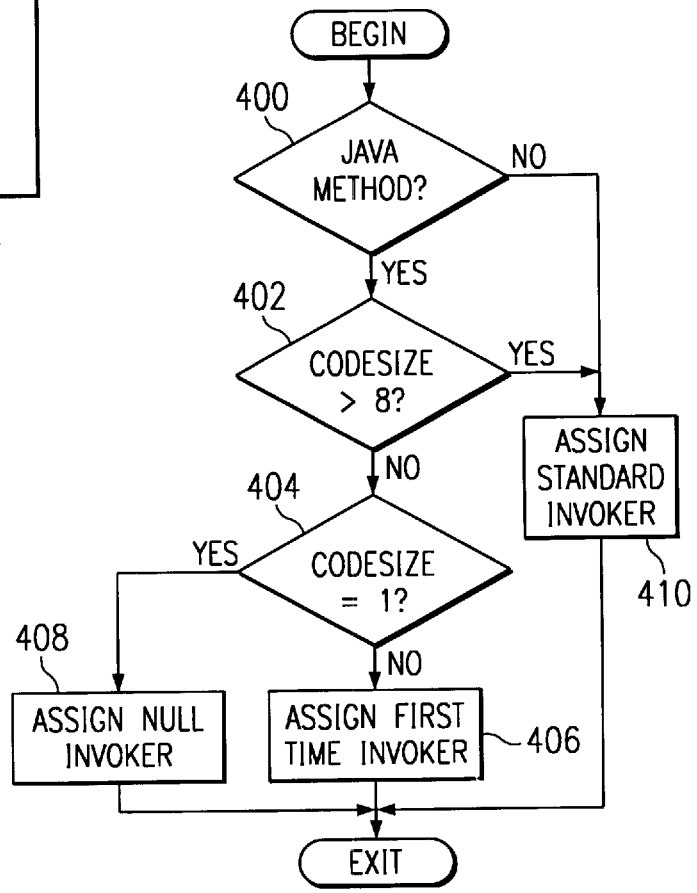
FIG. 4 is a flowchart of a process employed by a JVM to examine and assign invokers in accordance with a preferred embodiment of the present invention.

With reference now to FIG. 4, a flowchart of a process employed by a JVM to examine and assign invokers is depicted in accordance with a preferred embodiment of the present invention. The process illustrated in FIG. 4 is employed by a JVM to assign an invoker at class load time. The process begins by determining whether the method being loaded is a Java method (step 400). If the method is a Java method, a determination is made as to whether the code size of the Java method is greater than maximum template size (step 402). This step is used as a shortcut to avoid comparing obviously nontrivial methods to the templates. In the depicted example, methods having eight or fewer bytecodes are considered potential trivial methods that may be replaced with native code, which performs the function of the method. In this manner, the function activation and interpretation overhead for certain methods may be avoided. Of course, other criteria may be used to determine whether a method should be replaced with code other than bytecodes to avoid the function activation and interpretation overhead.

Next, a determination is made as to whether the code size is equal to one (step 404). If the code size is not equal to one, then a special first time invoker is assigned to the method (step 406) with the process terminating thereafter. This first time invoker is used to allow interpretation of the method the first time the method is invoked such that modification of any bytecodes into a final form may be performed to allow for accurate characterization of methods which should be replaced with a trivial invoker. When a method is first invoked, the JVM may perform constant pool resolution and conversion of bytecodes to a final form. When a bytecode is changed to a final form, the operands of the bytecode may be modified.

With reference again to step 404, if the code size of the method is equal to one then the method is clearly a null method in the depicted example. A null method is a method that does nothing but return to the caller. In such an instance, the pointer in the method block may be assigned to a null invoker as shown in step 408 with the process terminating thereafter. In this instance, no other characterization of the method is needed.

With reference again to steps 400 or 402, if the method is not a Java method, or the code size is greater than eight, a standard invoker is assigned (step 410) with the process terminating thereafter.

With reference now to FIG. 5, a flowchart of a process for processing a method using a first time invoker is depicted in accordance with a preferred embodiment of the present invention. When the pointer to the invoker in the method block is directed to a first time invoker, execution of the method results in the first time invoker saving the method block address (step 500). Thereafter, a normal invoke of the method is performed (step 502). This results in the called method being executed (step 504). When the method returns, the method block address is restored (step 506). Thereafter, a variable i is set equal to zero (step 508).

A determination is then made as to whether the called method matches a template (step 510). Each template contains the opcodes of each bytecode in the method. This uniquely identifies the method to be replaced. If the bytecodes in the method executed match those in the template, then the first time invoker sets a field in the method block to the value of Tinfo[i] (step 512). This step is used to obtain information or data that will be used by a trivial invoker. For example, if the trivial invoker used is Getafield, Tinfo[i] will contain an offset into an object field where the offset is extracted from the operand of get field-quick byteco getfield-quick is quick form of the Getafield bytecode. In the depicted example, this information will be stored in a reserved field in the method block. Thereafter, the invoker in the method block for this method is set equal to Tinvoker[i] (step 514) with the process terminating thereafter.

With reference again to step 510, if the called method does not match the template, then i is incremented (step 516). The bytecodes in the method may be compared to a number of different templates. This step is used to point to the next template. A determination is made as to whether i is greater than max (step 518). If i is greater than the variable max, then all of the templates have been compared to the method. If i remains less than the variable max, the process then returns to step 510. Otherwise, the invoker is set to the standard invoker (step 520) with the process terminating thereafter. In this instance, the invoker is set equal to some default invoker, such as a standard invoker. The template matching is performed in the depicted example by matching the opcode portion of the bytecodes in the called method to each opcode in a template.

With reference now to FIG. 6, a diagram illustrating a data structure containing templates is depicted in accordance with a preferred embodiment of the present invention. Data structure 600 includes a number of entries in which each entry contains a template, Tinfo and an identification of the invoker. Each template contains opcodes that are to be compared to opcodes in the potentially trivial method. Thus, only the operation fields (e.g., opcodes) in the bytecode are compared and not the parameters. The Tinfo associated with a template contains data that is to be moved to a reserved field in a method block for use by a trivial invoker. The identification of the invoker includes a pointer to the invoker that will be placed in a method block if the invoker is to be used with the method being examined.

With reference now to FIG. 7, an example of the process performed by a trivial invoker is depicted in accordance with a preferred embodiment of the present invention. In this example, the trivial invoker is one for the method "getafield". The process in this method starts by resetting the stacks (step 700). Thereafter the Tinfo value stored in the method block in step 512 in FIG. 5 is used as an offset to retrieve data from the current object. The retrieved data is then stored on the top of the stack (TOS); (step 702). Thereafter caller's next bytecode is dispatched for interpretation (step 704) with the process terminating thereafter. The getafield invoker returns a field from an object.

Thus, the present invention provides an improved mechanism for processing methods. In particular, the present invention allows for increased performance in execution of methods by avoiding the overhead involved with function activation and interpretation of methods. This improvement is provided by altering the invoker pointer in a method block to point to a specialized "invoker" that actually performs the function of the method rather than invoking the method. These mechanisms are particularly advantageous for use in computers, such as PDA's, in which a just-in-time compiler is not feasible.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer in which the virtual machine is located. The embodiment was chosen and described in order to best explain the principles of the invention, the practical application and to enable others of ordinary skill in the art to understand the invention for various embodiments with various modifications as are suited to the particular use contemplated.

What is claimed is:

1. A process in a computer for processing a method that includes a plurality of bytecodes and that performs a function, the process comprising the computer implemented steps of:

determining whether the method is to be executed normally when the method is loaded; and responsive to an absence of a determination that the method is a method to be executed normally, associating instructions native to the computer with the method, wherein the instructions perform the unction each time the method is called, wherein a method block is assigned to the method and includes a pointer to an invoker, and wherein the step of associating includes:

changing the pointer to point to the instructions native to the computer;

responsive to an invocation of the method, executing the method;

responsive to a completion of execution of the method, determining whether the plurality of bytecodes match a template; and responsive to the plurality of bytecodes matching the template, assigning to the method the instructions native to the computer, based on the template, wherein the instructions are assigned in place of the invoker.

2. The process of claim 1, wherein the step of determining includes:

comparing the plurality of bytecodes to a number of templates to determine whether the plurality of bytecodes match a template within the number of templates.

3. The process of claim 2, wherein the step of assigning includes:

assigning a default template to the method in response to an absence of a match between the plurality of bytecodes and the number of templates.

4. A process in a computer for processing a method that performs a function, the process comprising the computer implemented steps of:

determining whether the method is to be executed normally; and responsive to receiving a call to execute the method, executing an invoker containing instructions native to the computer, wherein the instructions perform the fraction, wherein a first invoker is associated with the method in which the first invoker initiates execution of bytecodes for the function and wherein the step of executing includes assigning a second invoker to the method in place of the first invoker, wherein the second invoker initiates execution of the instructions native to the computer, and wherein the step of determining includes:

responsive to an invocation of the method, executing the method; and responsive to a completion of execution of the method, determining whether the plurality of bytecodes match a template;

responsive to the plurality of bytecodes matching the template, assigning an invoker to the method based on the template.

5. The process of claim 4, wherein the step of determining whether the plurality of bytecodes match a template includes:

comparing the plurality of bytecodes to a number of templates to determine whether the plurality of bytecodes match a template within the number of templates.

6. The process of claim 5, wherein the step of assigning includes:

assigning a default invoker to the method in response to an absence of a match between the plurality of bytecodes and the number of templates.

7. The process of claim 4, wherein the method is a null method.

8. The process of claim 4 wherein the method is a getter method.

9. The process of claim 4, wherein the method is a setter method.

10. A process in a computer for processing a method, the process comprising the computer implemented steps of:

detecting loading of the method;

determining whether the method is a trivial method; and responsive to a determination that the method is a trivial method, changing an invoker for the method to execute native code for the method, wherein the method includes a plurality of bytecodes, wherein the invoker for the method is a first invoker, and wherein the process further includes:

responsive to an invocation of the method, saving a method block address associated with the method;

performing an invocation of the method, wherein the method is executed;

responsive to a completion of execution of the method, determining whether the plurality of bytecodes match a template; and responsive to the plurality of bytecodes matching the template, assigning a second invoker to the method based on the template.

11. The process of claim 10, wherein the step of determining comprises comparing the plurality of bytecodes to a number of templates to determine whether the plurality of bytecodes match a template within the number of templates.

12. The process of claim 11, wherein the step of assigning comprises:

assigning a default invoker to the method in response to an absence of a match between the plurality of bytecodes and the number of templates.

13. The process of claim 10, wherein the plurality of bytecodes are Java bytecodes.

14. A data processing system for processing a method that includes a plurality of bytecodes and that performs a function, the data processing system comprising:

determining means for determining whether the method is to be executed normally when the method is loaded; and associating means, responsive to an absence of a determination that the method is a method to be executed normally, for associating instructions native to the computer with the method, wherein the instructions perform the function each time the method is called, wherein a method block is assigned to the method and includes a pointer to an invoker and wherein the associating means includes:

changing means for changing the pointer to point to the instructions native to the computer;

executing means, responsive to an invocation of the method, for executing the method;

determining means, responsive to a completion of execution of the method, for determining whether the plurality of bytecodes match a template; and assigning means, responsive to the plurality of bytecodes matching the template, for assigning to the method the instructions native to the computer, based on the template, wherein the instructions assigned in place of an invoker.

15. The data processing system of claim 14, wherein determining means includes:

comparing means for comparing the plurality of bytecodes to a number of templates to determine whether the plurality of bytecodes match a template within the number of templates.

16. The data processing system of claim 15, wherein assigning means includes:

assigning means for assigning a default template to the method in response to an absence of a match between the plurality of bytecodes and the number of templates.

17. A data processing system for processing a method that performs a function, the data processing system comprising:

determining means for determining whether the method is a trivial method, and executing means, responsive to receiving a call to execute the method, for executing an invoker containing instructions native to the computer, wherein the instructions native to the computer perform the function, wherein a first invoker is associated with the method in which the first invoker initiates execution of bytecodes for the function, wherein the executing means assigns a second invoker to the method in place of the first invoker, wherein the second invoker initiates execution of the instructions native to the computer, and wherein the determining means further includes:

executing means, responsive to an invocation of the method, for executing the method;

second determining means, responsive to a completion of execution of the method, for determining whether the plurality of bytecodes match a template; and assigning means, responsive to the plurality of bytecodes matching the template, for assigning an invoker to the method based on the template.

18. The data processing system of claim 17, wherein the determining means includes:

comparing means for comparing the plurality of bytecodes to a number of templates to determine whether the plurality of bytecodes match a template within the number of templates.

19. The data processing system of claim 18, wherein the executing means includes:

means for assigning a default template to the method in response to an absence of a match between the plurality of bytecodes and the number of invokers.

20. A process in a computer for processing a method, the process comprising the computer implemented steps of:

detecting loading of the method;

determining whether the method is a trivial method; and responsive to a determination that the method is a trivial method, changing an invoker for the method to execute native code for the method.

21. A data processing system for processing a method that performs a function, the data processing system comprising:

determining means for determining whether the method is a trivial method; and executing means, responsive to receiving a call to execute the method, for executing an invoker containing instructions native to the computer, wherein the instructions perform the function and wherein execution of the invoker is conditioned on the method being a trivial method.

22. The data processing system of claim 21, wherein a first invoker is associated with the method in which the first invoker initiates execution of bytecodes for the function and wherein the step of executing includes assigning a second invoker to the method in place of the first invoker, wherein the second invoker initiates execution of the instructions native to the computer.

23. The data processing system of claim 21, wherein the method is a null method.

24. The data processing system of claim 21, wherein the method is a getter method.

25. The data processing system of claim 21, wherein the method is a setter method.

26. A computer program product in a computer readable medium for processing a method, the computer program product comprising:

first instructions for detecting loading of the method;

second instructions for determining whether the method is a trivial method; and third instructions, responsive to a determination that the method is a trivial method, for charging an invoker for the method to execute native code for the method.

\* \* \* \* \*

UNITED STATES PATENT AND TRADEMARK OFFICE
CERTIFICATE OF CORRECTION

PATENT NO. : 6,654,778 B1
DATED : November 25, 2003
INVENTOR(S) : Blandy et al.

It is certified that error appears in the above-identified patent and that said Letters Patent is hereby corrected as shown below:

Column 4,
Line 62, delete "bytecodest" and insert -- bytecodes --.

Column 7,
Lines 31-32, delete "byteco getfield-quick" and insert -- bytecode getfield_quick --.

Column 8,
Line 64, delete "unction" and insert -- function --.

Column 9,
Line 31, delete "fraction," and insert -- function, --.

Column 12,
Line 36, delete "charging" and insert -- changing --.

Signed and Sealed this

Twentieth Day of December, 2005

JON W. DUDAS
*Director of the United States Patent and Trademark Office*